(12) United States Patent
Ekern

(10) Patent No.: US 7,197,833 B1
(45) Date of Patent: Apr. 3, 2007

(54) FRAMING SQUARE JIG

(76) Inventor: Dennis W. Ekern, 410 Schnick Rd., Onalaska, WI (US) 54650

( * ) Notice: Subject to any disclaimer, the term of this patent is extended or adjusted under 35 U.S.C. 154(b) by 163 days.

(21) Appl. No.: 10/150,888

(22) Filed: May 16, 2002

Related U.S. Application Data

(60) Provisional application No. 60/291,268, filed on May 16, 2001.

(51) Int. Cl.
*B43L 13/00* (2006.01)

(52) U.S. Cl. .............................. 33/419; 33/420; 33/452; 33/456

(58) Field of Classification Search .......... 33/418–420, 33/452, 456
See application file for complete search history.

(56) References Cited

U.S. PATENT DOCUMENTS

| | | | | | |
|---|---|---|---|---|---|
| 303,861 | A | * | 8/1884 | King | 33/341 |
| 433,383 | A | * | 7/1890 | Wood | 33/420 |
| 482,350 | A | * | 9/1892 | Gagnebin | 33/420 |
| 638,446 | A | * | 12/1899 | Dean | 33/420 |
| 1,056,917 | A | * | 3/1913 | Len | 33/420 |
| 1,295,788 | A | * | 2/1919 | Nance | 33/420 |
| 1,301,166 | A | * | 4/1919 | Potter | 33/420 |
| 1,934,096 | A | * | 11/1933 | Shimp | 33/420 |
| 2,535,585 | A | * | 12/1950 | Marquiss | 33/420 |

* cited by examiner

*Primary Examiner*—Yaritza Guadalupe-McCall

(57) ABSTRACT

A tool for holding a framing square has a body with a pair of spaced longitudinal slots accommodating the flat legs of the framing square. Clamping devices mounted on the body clamp the body on the legs of the framing square to fix the position of the framing square on the body.

2 Claims, 4 Drawing Sheets

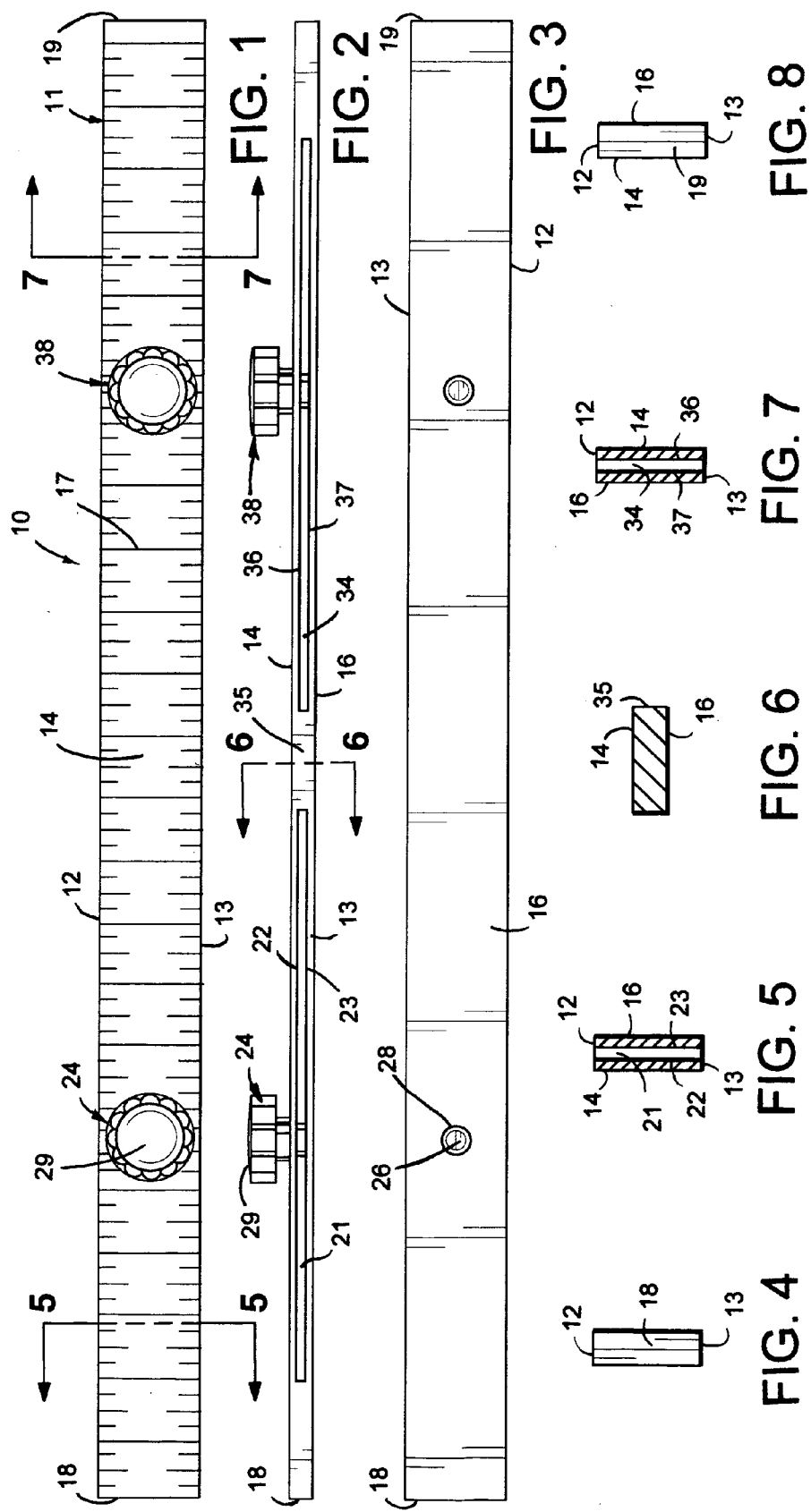

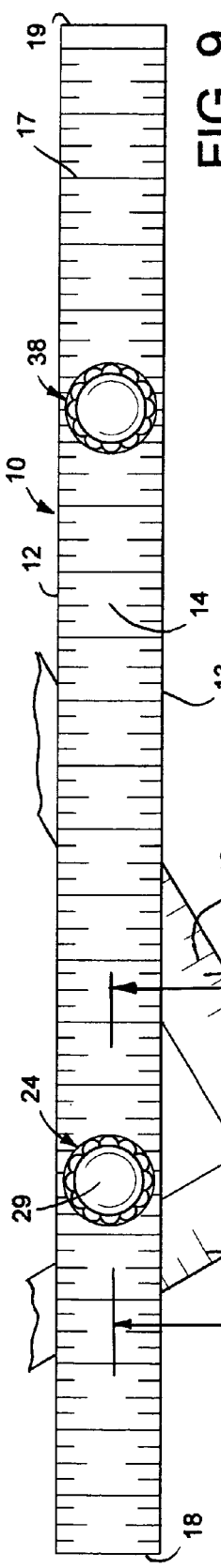
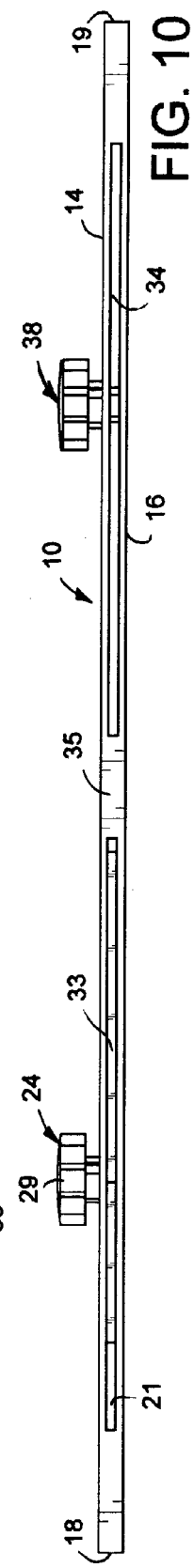
FIG. 9
FIG. 10
FIG. 11

_US 7,197,833 B1_

FRAMING SQUARE JIG

CROSS REFERENCE TO RELATED APPLICATION

This application claims the benefit of U.S. Provisional Application Ser. No. 60/291,268 filed May 16, 2001.

FIELD OF THE INVENTION

The invention is in the art of measuring, layout, and ruling tools. The tool is a framing square jig used for a variety of layout procedures, such as stain layouts, marking siding angles, roof layouts and linear markings of building construction materials.

BACKGROUND OF THE INVENTION

The invention of homes and buildings requires that construction materials, such as lumber, plywood, sheet materials and roofing be laid out and marked prior to sawing and cutting into selected shapes. Conventional framing squares are used to measure and lay out construction materials. A framing square is flat metal right angle tool having a longitudinal or long leg having a length of 24 inches and is transverse or short leg having a length of 12 inches. The legs have a width of two inches and ruler inch markings 1–24 and 1–12 along the lengths thereof. The ruler markings can be centimeters or a combination of inches and centimeters. Each piece of construction material that requires a layout must be measured and marked with a lumber pencil using the framing square. Repeated measurements require time and are subject to human error. The framing square jig or holder of the invention avoids the need for repeated measurements when laying out construction material.

SUMMARY OF THE INVENTION

The tool of the invention is used with a framing square for a variety of layout and marking procedures, such as stair layouts, roof layouts, marking siding angles, and straight and angular layouts. Repeated layouts are fast and accurate. The tool is also used separately as a straight edge or a cutting guide.

The tool holds a member having a first section and a second section located at an angle relative to the first section used to measure and mark an object, such as building construction material. The member includes a framing square and other devices used to mark an object. Each section is marked with numerical indicia along its length for measuring length, slope and angle layouts. The tool comprises an elongated body having opposite linear side edges. A first slot in the body extended along the length of the body between the side edges accommodates the first section of the member or both sections of the member. A second slot in the body spaced from the first slot extended along the length of the body between the side edges can accommodate the second section of the member. The positions of the first and second sections of the member are selected for a desired layout or angle marking of construction material. The member is secured to the body with first and second clamping devices. The first clamping device mounted on the body holds the first section of the member or the first and second sections of the member in a fixed position on the body. The second clamping device mounted on the body can be used to hold the second section of the member in a fixed position on the body. The first and second clamping devices are releasable to allow the position of the member to be adjusted relative to the body or removed from the body.

The preferred embodiment of the tool cooperates with a right angle flat member, known as a framing square. The member has a first flat linear section with an outer straight edge and a second linear section extended a right angle to the first section. The second section has an outer linear straight edge. The top and bottom flat surfaces or faces of the first and second sections have inch ruler markings 1–24 and 1–12. The tool has an elongated rectangular body with flat top and bottom surfaces and opposite to linear side edges. The top surface or face of the body has inch ruler markings along the length thereof. The body has a pair of spaced rectangular slots extended along the length of the body. The slots are located between the top and bottom surfaces of the body and extend between and are open to the opposite side edges of the body. The slots are also located opposite a center portion of the body. The body has longitudinal flat inside walls on opposite sides of each slot adapted to be retained in surface engagement with the flat sections of the member. Clamping devices mounted on the body function to clamp the body on the member to fix the position of the member relative to the body. The clamping devices are releasable to allow the position of the member to be adjustable relative to the body. The clamping devices comprise first and second manually adjustable members that extend through the middle of the first and second slots. The members are threaded bolts secured to knobs. The bolts cooperate with threaded holes as the body or nuts mounted on the body to clamp the flat sections of the member on the body. The knobs have cylindrical outer portions providing hand grips to facilitate turning of the bolts.

DESCRIPTION OF THE DRAWING

FIG. 1 is a top plan view of the framing square holder of the invention;

FIG. 2 is a front elevational view thereof, the rear elevational view being a mirror image thereof;

FIG. 3 is a bottom plan view thereof;

FIG. 4 is an end elevational view of the left end thereof;

FIG. 5 is a sectional view taken along line 5—5 of FIG. 1;

FIG. 6 is a sectional view taken along line 6—6 of FIG. 2;

FIG. 7 is a sectional view taken along line 7—7 of FIG. 1;

FIG. 8 is an end elevational view of the right end there;

FIG. 9 is a top plan view of the framing square holder of FIG. 1 combined with a framing square;

FIG. 10 is a front elevational view of FIG. 9;

FIG. 11 is a rear elevational view of FIG. 9;

DESCRIPTION OF THE DRAWING

Figure 12:
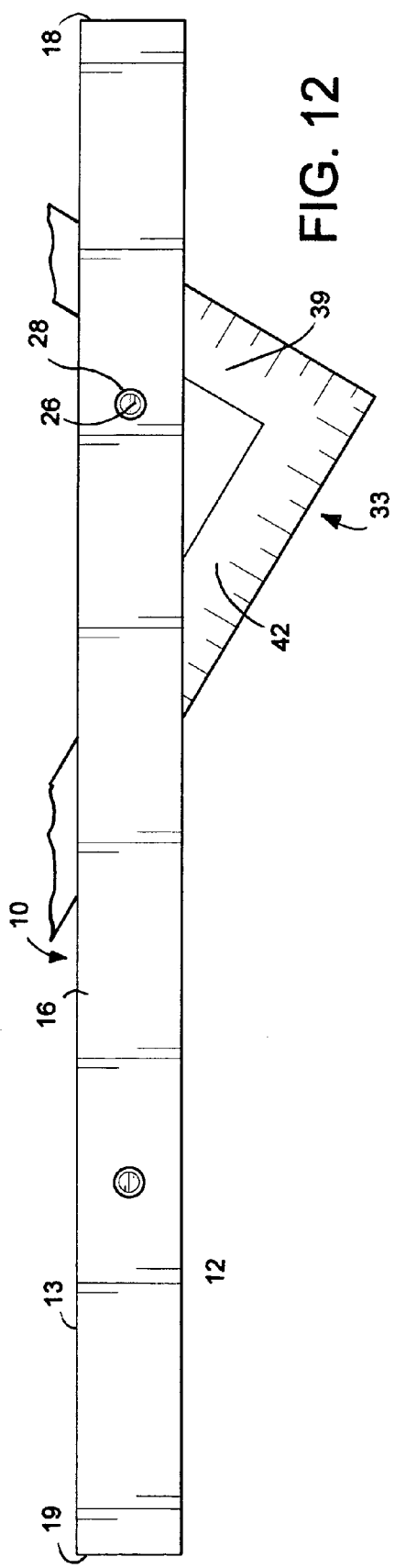
FIG. 12 is a bottom plan view of FIG. 9.

As shown in FIGS. 1 to 3, framing square holder 10 has an elongated rectangular body 11 of rigid material, such as metal, plastic or wood. Body 11 is preferably a one-piece aluminum bar having a length of 4 feet by 1.5 inches wide and 0.75 inches thick. A laminated or layered structure can be used for body 11. Body 11 can have other dimensions and be made of other types of rigid materials. The opposite side edges 12 and 13 of body 11 are straight or linear and parallel to each other providing straight edges or cutting guides for marking construction materials, such as lumber, plywood, sheet rock, roofing and siding. The body 11 has uniform thickness with a flat top surface or face 14 and a flat bottom surface 16. Top face 14 has inch ruler markings or indicia 17 which are the same inch ruler markings as are on a conventional framing square. The opposite ends 18 and 19 of body 11 are flat and normal to side edges 12 and 13.

Figure 14:
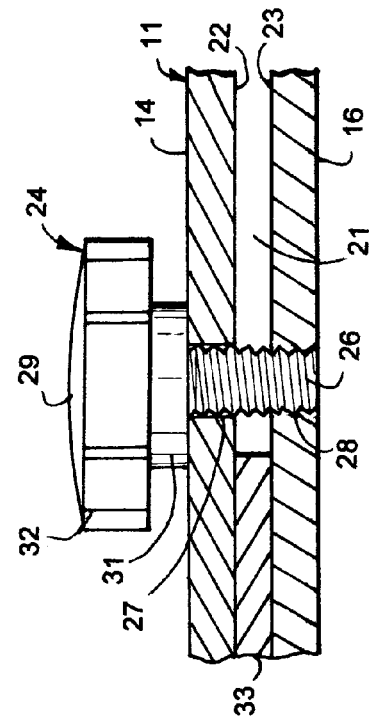
FIG. 14 is an enlarged sectional view taken along the line 14—14 of FIG. 9.
Figure 13:
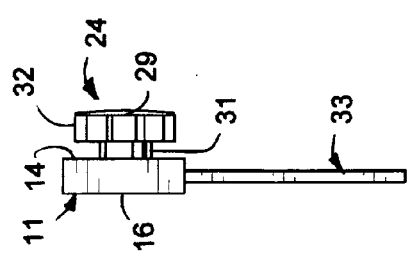
FIG. 13 is an end elevational view of FIG. 9.

As shown in FIGS. 2, 10, and 11, body 11 has a first longitudinal slot 21 extended between and open to side edges 12 and 13. Slot 21 has a length of about 21 inches. Body 11 has flat inside parallel continuous walls 22 and 23 on opposite sides of slot 21. The material of body 11 on opposite sides of slot 21 is flexible to allow the inside walls 22 and 23 to be clamped in surface engagement with a portion of a framing square 33. A clamping device, indicated generally at 24, mounted on body 11 is used to force inside walls 22 and 23 toward each other to clamp onto the framing square 33 as hereinafter described. Clamping device 24, shown in FIG. 14, has a bolt 26 extended through a hole 27 and threaded into a threaded hole 28 in body 11. Bolt 26 extends transversely through the longitudinal middle section of slot 21 to allow framing square to be located on either side of bolt 26. A knob 29 secured to the upper end of bolt 26 functions as a hand grip to facilitate turning of bolt to clamp and release framing square 33 from body 11. Knob 29 has a boss 31 bearing against top surface 14 and a cylindrical head 32 joined to boss 31.

Returning to FIGS. 1 to 3, body 11 has a second longitudinal rectangular slot 34 separated from slot 21 with a center bridge or member 35. Slot 34 is spaced inwardly from end 19. Flat and parallel inside walls 36 and 37 located adjacent opposite sides of slot 34 are clamped into surface engagement with a separate portion of framing square 33. A clamping device 38 mount on body 1 adjacent the middle of slot 34 is operable to clamp body 11 on framing square 33. Clamping device 38 has the same structure and operation as clamping device 24 shown in FIG. 14.

Figure 15:
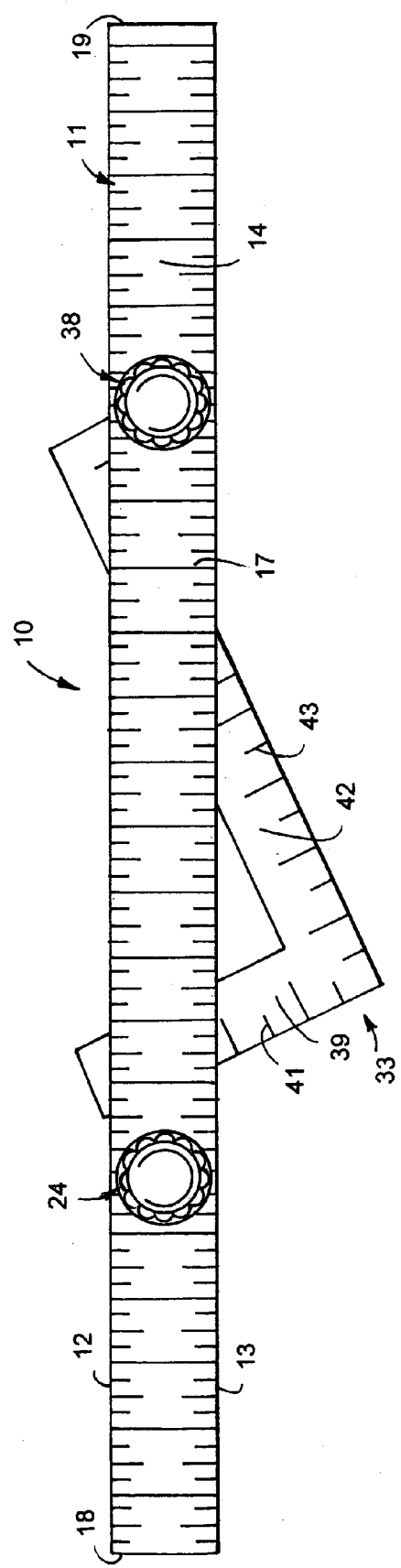
FIG. 15 is a top plan view of the framing square holder of FIG. 1 combined with a framing square located in the first and second slots in the body of the holder.

In use, as shown in FIGS. 9 and 10, framing square 33 has a flat short section or arm 39 with inch ruler markings 41 and a flat long section or arm 42 with inch ruler markings 43. A conventional framing square has a long arm with a length of 24 inches and a right angle short arm of 12 inches. Both sections 39 and 42 are inserted through slot 21 on opposite sides of clamping device 24. Clamping device 24 secures framing square 33 to body 11. FIG. 15 shows framing square extend through slots 21 and 34 in body 11 and clamped to body 11 with clamping devices 24 and 39. When both sections 39 and 42 of framing square 33 are located in one or both slots 21 or 21 And 34, the framing square 33 is moved to a selected position relative to body 11. The location of framing square relative to body 11 is determined by what procedure is to be accomplished. After the correct numbers on sections 39 and 42 of framing square are at the correction location relative to body 11, one or both of the clamping devices 24 and 38 are tightened down to clamp the framing square 33 in surface engagement with the inside walls of body 11 thereby fixing the position of framing square 33 on body 11. The edge 13 of body 11 is placed against the edge of the material to be marked out and slide the body 11 along this edge to the place for starting the marking with a lumber pencil or other marking device. The markings are determined by the procedure involved. The tool allows the user to slide framing square 33 right out to the end and even past the end of the material being marked out.

There has been shown and described an embodiment of the framing square holder of the invention. Changes in the materials, structures, ruler markings, and arrangement of structures may be made by persons skilled in the art without departing from the invention. The invention is defined in the following claims.

The invention claimed is:

1. A tool for holding a right angle flat member having a first linear section and a second linear section extended at a right angle relative to the first section, said first and second linear sections having measuring indicia marked along the lengths thereof comprising: an elongated rectangular linear body having flat top and bottom surfaces, opposite linear side edges, a first end extended between the top and bottom surfaces, a second end extended between the top and bottom surfaces, a bridge extended between said top and bottom surfaces located halfway between said first and second ends, first and second portions located on opposite sides of an enclosed first rectangular slot in said body extended along the length of the body open to said side edges and located between the first end and the bridge for accommodating the first linear section of the right angle flat member, said first and second portions of the body having first longitudinal flat parallel inside walls on opposite sides of the first slot, third and fourth portions located on opposite sides of an enclosed second rectangular slot in said body extended along the length of the body open to said side edges and located between the second end and the bridge for accommodating the second linear section of the right angle flat member, said body having second longitudinal flat parallel inside walls on opposite sides of the second slot, said first and second slots having the same longitudinal length, linear measuring indicia marked on the length of the top surface of the body corresponding to the measure indicia on the right angle flat member, a first fastener mounted on the body in a fixed position spaced from the first linear section of the right angle flat member and extended normal through the middle of the first slot operable to clamp the first section of the right angle flat member in flat surface engagement with the first flat inside walls of said body, said first fastener comprising a first halt extended through a hole in the first portion of the body and middle of the first slot and threaded into a threaded hole in the second portion of the body, and a knob attached to the first bolt engagable with the top surface of the body whereby turning the first bolt with the knob clamps the first linear section of the right angle member between the first and second portions of the body, and a second fastener mounted on the body in a fixed position spaced from the second linear section of the right angle flat member and extended normal through the middle of the second slot operable to clamp the second section of the right angle flat member in flat surface engagement with the second inside walls of said body, said second fastener comprising a second bolt extended through a hole in the third portion of the body and middle of the second slot and threaded into a threaded hole in the fourth portion of the body, and a knob attached to the second bolt engageable with the top surface of the body whereby turning the second bolt with the knob clamps the second section of the right angle flat member between the third and fourth sections of the body thereby holding the right angle flat member on the body.

2. In combination: a right angle member having a flat linear first section and a flat linear second section extended at a right angle relative to the first section, said first section and second section having measuring indicia marked along the length thereof, an elongated linear body having flat top and bottom surfaces, opposite linear side edges, a first end extended between the top and bottom surfaces, a second end extended between the top and bottom surfaces, a bridge extended between said top and bottom surfaces located halfway between said first and second ends, said body having first and second portions with first inside flat walls on opposite sides of an enclosed first slot in said body extended along a first portion of the length of the body open to said side edges and located between the first end and the bridge, said first section of the member extending through said first slot in surface engagement with the first inside flat walls, said body having third and fourth portions with second inside flat walls on opposite sides of an enclosed second slot in said body extended along a second portion of the body open to the side edges and located between the second end and the bridge, said second section of the member extending through said second slot, said first and second slots having the same longitudinal length, linear measuring indicia marked on the length of the top surface of the body corresponding to the measuring indicia on the right angle flat member, a first fastener mounted on the body in a fixed position spaced from the first section of the member and extended normal through the middle of the first slot operable to clamp the first section of the member in flat surface engagement with the first inside flat walls of the body, said first fasteners comprising a first holt extended through a hole in the first portion of the body and middle of the first slot and threaded into a threaded hole in the second portion of the body, and a knob attached to the first holt engageable with the top surface of the body whereby turning the first bolt with the knob clamps the first linear section of the right angle member between the first and second portions of the body, and a second fastener mounted on the body in a fixed position spaced from the second section of the member and extended normal through the middle of the second slot operable to clamp the second section of the member in flat surface engagement with the second inside flat walls of the body, said second fastener comprising a second bolt extended through a hole in the third portion of the body and middle of the second slot and threaded into a threaded hole in the fourth portion of the body, and a knob attached to the second bolt engageable with the top surface of the body whereby turning the second holt with the knob clamps the second section of the right angle flat member between the third and fourth sections of the body.

\* \* \* \* \*